(12) United States Patent
Maruyama et al.

(10) Patent No.: US 9,908,083 B2
(45) Date of Patent: Mar. 6, 2018

(54) ABSORPTION TYPE—REMOVAL / CONDENSING APPARATUS

(71) Applicant: SEIBU GIKEN CO., LTD., Fukuoka (JP)

(72) Inventors: Kanae Maruyama, Fukuoka (JP); Koji Inoue, Fukuoka (JP); Hiroshi Okano, Fukuoka (JP); Ayako Kuroda, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 141 days.

(21) Appl. No.: 14/976,601

(22) Filed: Dec. 21, 2015

(65) Prior Publication Data

US 2016/0175772 A1    Jun. 23, 2016

(30) Foreign Application Priority Data

Dec. 19, 2014 (JP) .................................. 2014-256748
Jul. 22, 2015 (JP) .................................. 2015-144505

(51) Int. Cl.
*B01D 53/06* (2006.01)
*B01D 53/62* (2006.01)

(52) U.S. Cl.
CPC ............. *B01D 53/62* (2013.01); *B01D 53/06* (2013.01); *B01D 2251/304* (2013.01);
(Continued)

(58) Field of Classification Search
CPC ........ Y02C 10/04; Y02C 10/06; Y02C 10/08; B01D 53/06; B01D 53/62;
(Continued)

(56) References Cited

U.S. PATENT DOCUMENTS 5,061,455 A * 10/1991 Brose .................... B01D 53/04
                                                        423/228
6,908,497 B1    6/2005 Sirwardane
(Continued)

FOREIGN PATENT DOCUMENTS

JP    2012-61389    3/2012
JP    2012-115773   6/2012

OTHER PUBLICATIONS

"Earth Carbon Dioxide—Management—Technique", <http://www.meti.go.jp/meti_lib/report/2012fy/E002155.pdf#search='RITE+%E5%9B%BA%E4%BD%93%E3%82%A2%E3%83%9F%E3%83%B3+%E6%88%90%E6%9E%9C%E5%A0%B1%E5%91%8A%E6%9B%B8+%E5%B9%B3%E6%88%9022%E5%B9%B4>.

*Primary Examiner* — Frank Lawrence
(74) *Attorney, Agent, or Firm* — Staas & Halsey LLP (57) ABSTRACT

An absorption-type carbon dioxide removal/condensing apparatus is removes or condenses carbon dioxide so that the apparatus secures high recovery efficiency. The apparatus has a honeycomb rotor holding a carbon dioxide absorbent, which is divided into at least a processing zone and a reproduction zone. After anyone of reproduction air for heating and a processing air is humidified by a humidifying device, both airs are ventilated into the zones, respectively. Thereby, the apparatus can improve absorption performance and density performance. If the honeycomb rotor is further divided into at least first and second processing zones, an air to be processed is humidified by a humidifier to ventilate into the first processing zone, and then a portion or all of the processing air which passed through the first procession zone is passed through the second procession zone (second pass).

15 Claims, 5 Drawing Sheets

(52) U.S. Cl.
CPC .. *B01D 2251/306* (2013.01); *B01D 2251/606* (2013.01); *B01D 2252/20484* (2013.01); *B01D 2252/20489* (2013.01); *B01D 2253/112* (2013.01); *B01D 2253/206* (2013.01); *B01D 2253/25* (2013.01); *B01D 2253/3425* (2013.01); *B01D 2257/302* (2013.01); *B01D 2257/404* (2013.01); *B01D 2257/406* (2013.01); *B01D 2257/504* (2013.01); *B01D 2257/708* (2013.01); *B01D 2257/90* (2013.01); *B01D 2258/06* (2013.01); *B01D 2259/4009* (2013.01); *B01D 2259/4508* (2013.01); *Y02C 10/04* (2013.01); *Y02C 10/06* (2013.01); *Y02C 10/08* (2013.01)

(58) Field of Classification Search
CPC ........ B01D 2251/304; B01D 2251/306; B01D 2251/606; B01D 2252/20484; B01D 2252/20489; B01D 2253/112; B01D 2253/206; B01D 2253/25; B01D 2253/3425; B01D 2257/302; B01D 2257/404; B01D 2257/406; B01D 2257/504; B01D 2257/708; B01D 2257/90; B01D 2258/06; B01D 2259/4009; B01D 2259/4508
USPC ............... 96/109, 111, 125; 95/10, 139, 113; 423/228, 230
See application file for complete search history.

(56) References Cited

U.S. PATENT DOCUMENTS

| | | | |
|---|---|---|---|
| 7,288,136 B1 | 10/2007 | Gray et al. | |
| 8,500,854 B1* | 8/2013 | Pennline | B01D 53/0462 95/117 |
| 8,951,490 B2* | 2/2015 | Okumura | B01D 53/04 422/168 |
| 9,101,912 B2* | 8/2015 | Bedell | B01J 20/3475 |
| 2012/0000365 A1* | 1/2012 | Okano | B01D 53/06 96/144 |
| 2012/0160099 A1* | 6/2012 | Shoji | B01D 53/025 95/139 |
| 2014/0175336 A1* | 6/2014 | Gupta | B01D 53/06 252/373 |

* cited by examiner

Fig. 3 outside air

Fig. 8

ABSORPTION TYPE—REMOVAL / CONDENSING APPARATUS

CROSS REFERENCE TO RELATED APPLICATIONS

This application is based on and hereby claims priority to Japanese Application No. 2015-144505 filed on Jul. 22, 2015 and Japanese Application No. 2014-256748 filed on Dec. 19, 2014, the contents of which are hereby incorporated by reference.

BACKGROUND

The present invention is related to an absorption type-removal/condensing apparatus which can remove and condense carbon dioxide in response to objects, for example, such as an object of removing inside carbon dioxide in buildings etc., and an object of supplying high-density condensed carbon dioxide to a plant house made by vinyl, a plant factory, etc., by using a honeycomb rotor which holds carbon dioxide absorbents, for example, such as potassium carbonate, an amine installation porous material, and weakly basic ion-exchange resin to separate carbon dioxide included in an air to be processed from the air to be processed.

The adsorption-and-desorption type condensing device is conventionally known, as a device which can separate and remove in a low temperature gas-like material to be removed from air to be processed in a state of being condensed. For example, as Japanese Patent Laid-Open Publication No. 2012-61389 ("JP '389") and Japanese Patent Laid-Open Publication No. 2012-115773 ("JP '773") disclose, the condensing device uses a breathable adsorption rotor held adsorption material, heating and humidifying means for reproducing and heating and humidifying means for purging The chemical absorbing method by amine solution is now known as one of the separation and collection techniques of carbon dioxide. Since an immense energy is required in order to separate the carbon dioxide from the amine solution in which the carbon dioxide is absorbed (when the amine solution is heated to be reproduced), reduction of the energy for reproducing the amine solution is desired. As one of the solutions, a development of a solid absorbent is progressing. The solid absorbent can reduce energy concerning to heating of excessive moisture which exists in a solution system at reproduction of the solid absorbent.

As disclosed in the Result report, The Earth Carbon dioxide collection-management-technique highly advanced enterprise for Heisei 22 year by the Public utility foundation legal entity Research Institute of Innovative Technology, the absorption process of the carbon dioxide using amine solution is generally indicated by the following formulas.

The first class amine (R—NH2)

[1]

[2a]

[2b]

The second class amine (R1R2-NH)

[3]

[4a]

[4b]

If carbon dioxide absorption liquid can perform carbon dioxide absorption at processes [2a] and [2b] and at the processes [4a] and [4b] indicated in the second process, reaction fever becomes small rather than the reaction indicated by [1] or [3]. There is a merit that energy of desorption reproduction can be lessened. That is, if an amine support solid absorbent is used, in a low-temperature condition that, for example, absorption centigrade (Temperature is indicated in "Centigrade" hereinafter) is 15° C. and desorption centigrade is 45° C., it is thought that reactions as indicated by [2a], [2b], [4a], and [4b] occur. However, as these reactions progress under existence of water, coexistence of moisture (hygroscopic surface moisture) is indispensable.

Since the third class amine does not have NH combination, the reaction indicated above does not occur. For example, the third class amine does not perform the absorption and desorption of carbon dioxide in a low-temperature condition that absorption centigrade is 15° C. and desorption centigrade is 45° C. Therefore, in order to solve the problems, it is important to make the reproduction temperature low.

SUMMARY

What was disclosed in JP '389 and JP '773 carries out, by absorption and desorption of an absorbent, separation and removal of a material to be removed in a state of gas from an air to be processed, and makes a heated air to be reproduced in low temperature into a humidification state. Also, what was disclosed in these documents changes, removes and absorbs the material to be removed in a state of absorption so as to be desorbed from the absorbent by moisture. Furthermore, what was disclosed makes efficiently the material to be removed in an adsorption state to be removed and absorbed from the absorbent in a reproduction zone.

If what was disclosed in JP '389 and JP '773, by using a zeolite known generally as absorbent, makes carbon dioxide to be separated from moisture by substitution and desorption with moisture, the moisture is absorbed and sticks to fine pores of the zeolite and a carbon dioxide adsorption capability of the zeolite declines remarkably. As a result, since substance recovery rate of a device (namely, efficiency which carries out separation and removal of the material to be removed by adsorption from the air for processing in a processing zone) falls remarkably, operation of the device by heating and humidification is impossible.

Also, if solution of amine is used, a reproduction of the solution of amine takes a lot of energies. For example, a high temperature of 120° C. is necessary. Additionally, degradation and smell problems also arise by reproducing at such high temperature.

If an amine support solid absorbent is used instead of zeolite as carbon dioxide absorbent and vapor is used as gas for reproduction ventilated in a reproduction zone, such effect that the carbon dioxide desorption from the amine support solid absorbent and humidity is obtained. However, an equipment of boiler is necessary in this case and it is a device which is expensive and has much energy expenditure.

In view of the above circumstances, the main subject of the present invention is to provide an absorption type-removal/condensing apparatus which can secure substance recovery rate of the apparatus highly with energy for reproduction reduced by humidifying low-temperature reproduction air in use of the absorbent of carbon dioxide such as an amine support solid absorbent. In the case of the amine support solid absorbent, the above-mentioned degradation and smell problems are also reduced by reproducing at low temperature.

Concerning to our invention, for solving the above problems, an absorption type-removal/condensing apparatus comprises a honeycomb rotor which has an absorption function of carbon dioxide as amine support solid absorbent. The honeycomb rotor is divided into at least a processing zone and a reproduction zone. Carbon dioxide is removed from the air to be processed by making a maintenance absorbent of a rotor portion absorb the carbon dioxide contained in the air to be processed by ventilating the air to be processed through said processing zone, and the carbon dioxide absorbed in said processing zone by the maintenance absorbent is made to be contained into the air to be reproduction by ventilating the air to be reproduced through said reproduction zone to reproduce the maintenance absorbent of the rotor portion. The apparatus has a humidity adjustment device which makes high relative humidity of any of the air to be reproduced ventilated through the reproduction zone and the air to be processed ventilated through the processing zone or both. It is desirable for the humidity adjustment device to humidify after heating. Also, the device may heat after humidifying.

If a high humidity air is used as air for reproduction ventilated in the reproduction zone, an energy loss by moisture desorption from an absorbent can decrease, and simultaneously an absorbent which needs to co-exist with moisture such as an amine support solid absorbent reacts easily. If a moisture content rate in an absorbent is maintained by humidifying air for reproduction in a reproduction zone, it is effectively avoidable that a state where desorption is insufficient arises in the reproduction zone, using low-temperature air for reproduction. On the other hand, since a water of an absorbent is maintained in the processing zone, the absorbent can absorb carbon dioxide efficiently.

If, in the reproduction zone, the air as the substantially same humidity as an open air or an air in a room has is heated to be produced, the reproduced air has low a relative humidity and renewal energy is consumed by desorbing the moisture. As a result, carbon dioxide desorption performance comes to fall. However, desorption of moisture is suppressed by humidifying the reproduced air to make the reproduced air have high humidity, and carbon dioxide desorption performance improves.

If, in a processing zone, the air to be processed is humidified by humidifiers of an evaporation type, a water spray type and an ultrasonic type except for a heating type, the temperature of the air to be processed decreases by evaporative cooling effect and an absorption performance of carbon dioxide improves. Simultaneously, the moisture which is absorbed in the processing zone is separated and removed in the reproduction zone to is supplied to a reproduction circulatory system way.

In this case, the above-mentioned consumption of the renewal energy by desorbing the moisture occurs temporarily. However, if the air of the reproduction circulatory system comes to be maintained at high humidity, a desorption of the moisture by the reproduced air is suppressed and, therefore, a moisture absorption in the processing zone decreases.

When it is used for the object of removing indoor carbon dioxide in buildings, etc., especially in winter or a season in a mid-term, there is also an effect of preventing a supplied air from being dry excessively. On the other hand, as a humidifying method of the air to be processed, a temperature of the air to be processed may be lowered by a cooling device to raise the relative humidity.

The moisture and the heat which are desorbed from in the reproduction zone can supply moisture and temperature to a reproduction entrance by using together with the reproduction circulatory system way, a total heat exchanger, etc.

As to a temperature of the reproduction entrance, it is desirable to make it low as much as possible in a range that a necessary substance recovery efficiency is acquired, and the temperature at the reproduction zone entrance decreases less than 100° C. if the air for reproduction is humidified. As a humidifying method, various humidifying devices, such as a water heating type, an evaporation type, a water spray type and an ultrasonic type, are adoptable or employable.

The absorption type removal/condensing apparatus of the present invention is constituted as mentioned above. When the air to be processed is ventilated to the processing zone, the carbon dioxide contained in the air to be processed is absorbed by a support solid absorbent of a rotor portion to be separated and removed from the air to be processed. Also, when the air for reproduction is ventilated to the reproduction zone, the carbon dioxide absorbed by the support solid absorbent is separated from the support solid absorbent and adheres to the reproduction air. Thereby, the support solid absorbent of the rotor portion is reproduced.

In addition, by humidifying any of the air to be processed ventilated to the procession zone or the air for reproduction, or both, an improvement in removal/density performance of carbon dioxide is expectable.

If a circulated air in a room is ventilated into the processing zone of the absorption type removal/condensing apparatus of the present invention, a density of the carbon dioxide of the exit air becomes low. If the exit air is supplied to a room where a density is high, the density of the carbon dioxide in the room is made to be low. In this case, since the amount of open air introduced in order to reduce indoor carbon dioxide levels can be reduced sharply, compared with the usual ventilation, it becomes energy saving. Also, since a reproduced exit air which is passed through the reproduction zone of absorption type removal/condensing apparatus of the present invention has a high density of carbon dioxide, if the reproduced exit air is introduced into a room for plants such as a house made by vinyl and a plant factory, the reproduced exit air can make the plants grow early and a discharge of the carbon dioxide to environments can be suppressed. By using both the reproduced exit air and the processed exit air processed by the absorption type removal/condensing apparatus of the present invention, the high density carbon dioxide in the reproduction zone may be supplied to the house made by vinyl with the carbon dioxide in the room removed. If the absorption type removal/condensing apparatus of the present invention adjusts an air-condition in the buildings by the processed exit air, a carbon dioxide generated from humans etc., is supplied, for example, to the house made by vinyl built on a roof of the building to make the plants in the house progress in their growth. Thereby, a circulation of the air-conditioning of carbon dioxide can be also attained.

The absorption type removal/condensing apparatus of the present invention can make a quality of the indoor air improve further by combining with a honeycomb rotor which has an adsorption capability of odor material, such as a volatile organic compound (referring to as "VOC" hereinafter) and ammonia.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The present invention has a honeycomb rotor with a carbon dioxide absorption function, and the honeycomb rotor is divided into at least a processing zone and a reproduction zone. When the air to be processed is ventilated in the processing zone, a separation and a removal of the carbon dioxide are carried out from the air for processing. Also, the air for reproduction is ventilated in the reproduction zone, an operation of desorbing carbon dioxide is carried out. The present invention has a humidity adjustment device which makes a relative humidity of any of the heated air for reproduction ventilated in the reproduction zone high and the processed air ventilated in a processing zone, or both.

A preferred embodiment of absorption type removal/separation apparatus of the present invention is, hereinafter, described in detail along with FIG. 1.

Reference number 1 denotes a honeycomb rotor, and the rotor is constituted by a corrugate (wave like forming) processing of the non-flammable sheet of ceramic textiles paper etc., and by a rolling processing of the sheet in a shape of a rotor. The rotor supports Organic system absorbents such as potassium carbonate (GCC acid potassium) and sodium carbonate (sodium bicarbonate), inorganic system absorbents such as tri-ethanol amine and mono-ethanolamine, and weakly basic ion-exchange resin.

The honeycomb rotor 1 is divided into a processing zone 2 and a reproduction zone 4. An indoor air is supplied to the processing zone 2 by a blower (not shown in the drawings, since it is general or well known) and so on.

By ventilating the air to be processed into the processing zone 2, the absorbent of a rotor portion is made to absorb the carbon dioxide contained in the air to be processed to separate and remove the carbon dioxide from the air to be processed so that a density of carbon dioxide in the air decreases.

In the reproduction zone 4, by ventilating the air for reproducing heated by a heater 5 into a humidifying device 6 for reproduction, the carbon dioxide which is absorbed by the rotor is made to be separated from the rotor to adhere to the air for reproduction so that the maintenance absorbent of the rotor portion in a passing process of the zone is reproduced.

If the weakly basic ion-exchange resin which has especially primary amine and/or the second class amine as a functional group is used as a solid absorbent, a reaction as indicated by the above formula [2a], [2b], [4a] and [4b] occurs, and it is thought that the continuation derivative model of an amine carbon dioxide-basin system is made. That is, the solvent as a continuation dielectric is made on the surroundings of a HCO3—molecule as solute, and electric charge distribution of a solute molecule causes polarization in the surrounding solvent.

In the continuation derivative model, since the formulas [2a], [2b], [4a] and [4b] are promoted under low-temperature conditions by such an interaction between a solute and a solvent, a reactive ability such as a rate of absorption and diffusion speed become high.

Therefore, by humidifying at the reproduction temperature of a low temperature, shows a different action from a technology which has processes of making the heated air for reproduction in a state of being humidified and making the materials removed in a state of being absorbed and adhering as disclosed in JP '389 and JP '773.

In a case where the reproduction entrance is not humidified, a degree from 50 through 60° C. or more of reproduction temperature is necessary in order to perform the suitable carbon dioxide removal for the apparatus. However, since reproduction temperature can be lowered to about a degree of from 30 through 40° C. by humidifying the reproduction entrance, a degradation of an amine support solid absorbent can be reduced and the honeycomb rotor can be used longer.

Furthermore, it becomes possible to control the odor emission from the honeycomb rotor by disassembly of amine, etc., such as amine-like odor.

If the rotor is manufactured by way of that an absorbent such as activated carbon and zeolite is made by including the absorbent such as amine solution as the technology of the prior arts, the absorbent may cause movement and desorption, or may cause a repetition of liquefaction and solidification and may lead to the degradation of a rotor, or breakage of a rotor. However, those problems can be prevented by using an amine support solid absorbent.

Figure 6:
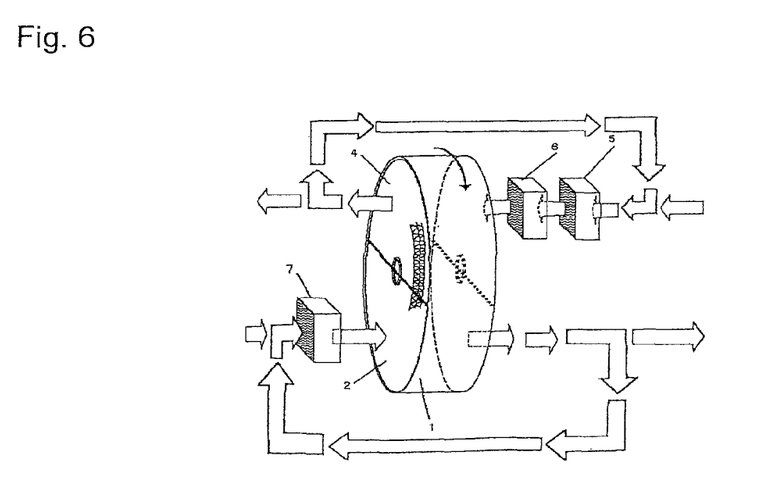
FIG. 6 shows a flow chart in a modification of the preferred embodiment 1 of absorption type removal/condensing apparatus of the present invention.

The modification of the preferred embodiment 1 is shown in FIG. 6. The explanations for the modification which overlaps with the preferred embodiment 1 of FIG. 1 are omitted. In the modification, a separation removal by the humidifying device 7 for processing is carried out by making the air to be processed pass through the humidifying device 7 and making a carbon dioxide included the air to be processed absorbed by the absorbent of the rotor. As a next process, a portion or a whole of the air at the processing exit is passed back in front of the humidifying device 7 and is passed through the processing zone 2, and the carbon dioxide is removed so that the density of carbon dioxide is reduced.

In the reproduction zone 4, the density of carbon dioxide is further raised by circulating a part of the air for reproduction. Although the absorption type removal/separation apparatus is combined altogether with all of the humidification device for processing, the processing circulation, and the reproduction circulation in this embodiment, the absorption type removal/separation apparatus of the present invention may perform by a combination with at least one of the above devices.

Figure 2:
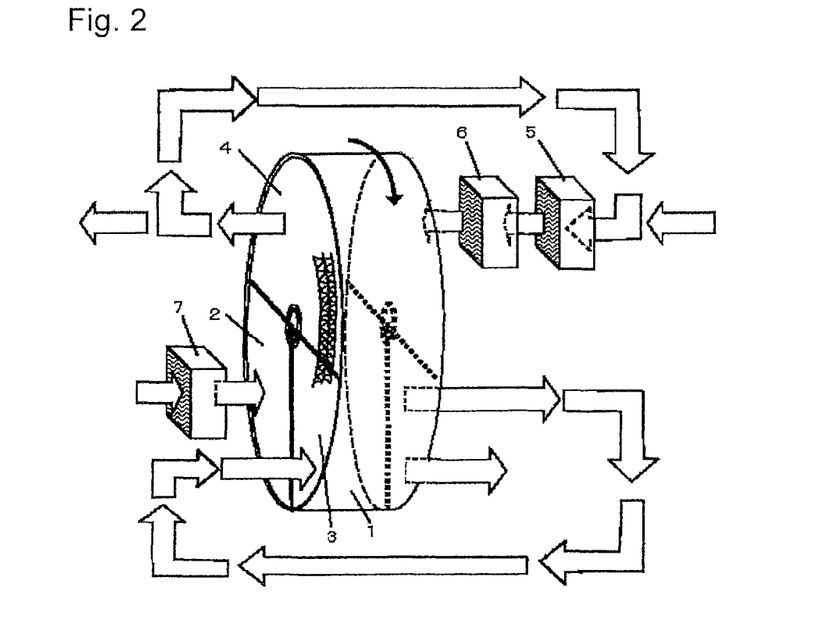
FIG. 2 shows a flow chart in a preferred embodiment 2 of absorption type removal/condensing apparatus of the present invention.

As shown in FIG. 2, a honeycomb rotor 1 is divided into a processing zone 2, a processing zone 3 and a reproduction zone 4. An indoor air is supplied to the processing zone 2 a blower (not shown in the drawings, since it is general or well-known) and so on.

Carbon dioxide included in an air to be processed is made to be absorbed by an absorbent of the rotor to be separated and removed from the air to be processed. As a next process, a part or a whole of the processing exit air is passed through processing zone 3. Thereby, the carbon dioxide is further removed and the density of carbon dioxide is reduced.

In the reproduction zone 4, the used air for reproduction which passed through reproduction zone 4 and an outside air (an open air) are mixed, the air for reproduction heated by heater 5 is ventilated to the humidification device 6 for reproduction, the air for reproduction is desorbed from the absorbed carbon dioxide, and the maintenance absorbent of the rotor portion in a process of passing through the zone. By circulating a part of air for reproduction, the density of carbon dioxide is further raised.

Figure 3:
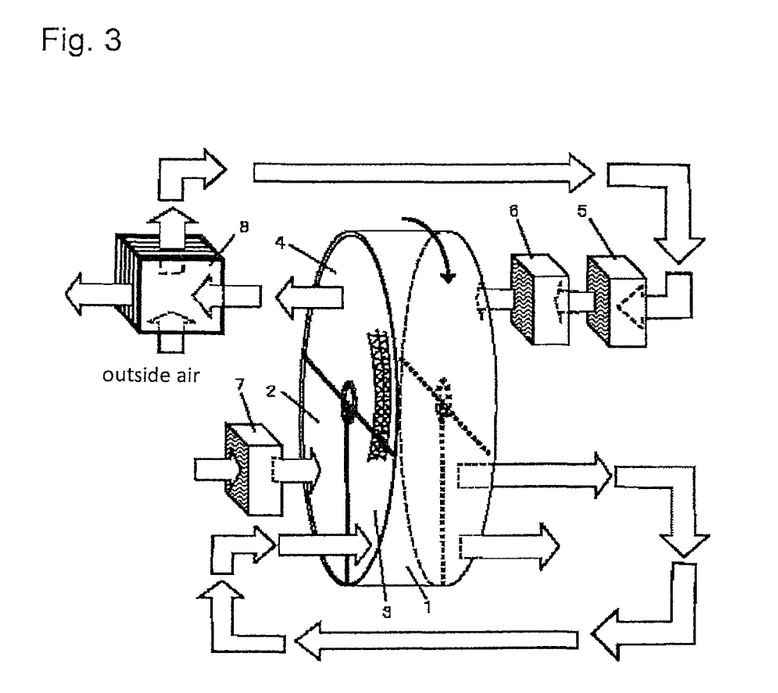
FIG. 3 shows a flow chart in a preferred embodiment 3 of absorption type removal/condensing apparatus of the present invention.

As shown in FIG. 3, enthalpy is collected by making the reproduction exit air of the embodiment 2 and an outside air (open air) pass to different passages of a total heat exchanger 8, respectively, to reduce a volume of energy for reproduction. Not only in the embodiment 2 but also in other embodiments, an energy saving effect can be planned by heat-exchanging the reproduction exit air with high enthalpy and the open air for reproduction by combining with total heat exchanger.

As explained above, a structure of the embodiment of the absorption type removal/condensing apparatus of the present invention is explained. Next, the functions of the embodiment of the apparatus are explained by setting some of numeral conditions for air in the preferred embodiment 2 as follows. First, as an example in a graph shown in FIG. 4, a comparison about the outlet density of the carbon dioxide in the reproduction zone is indicated in a case where an absolute humidity of the air (55° C.) for low-temperature reproduction is set at from 4 through 30 g (Density of carbon dioxide is set at 450 ppm.). As to the conditions in the air to be processed in the processing zone, a density of Carbon dioxide is set to be at 1000 ppm, the temperature is set to be at 23° C., an absolute humidity is set to be at 12.3 g/kg' (at relative humidity 70%) and the rotor side wind velocity is set to be at 2.0 m/s (0° C., 1 atm).

Figure 4:
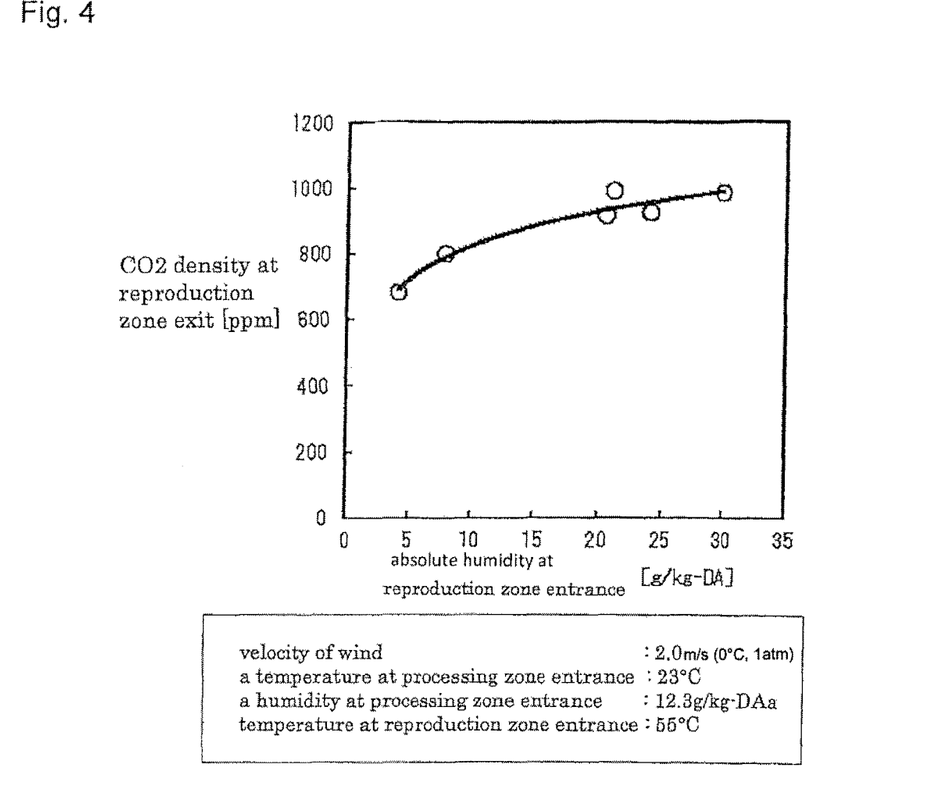
FIG. 4 shows a graph which indicates a correlation with the density of carbon dioxide and the absolute humidity of the air for reproduction in a reproduction zone exit.

It is understandable from the example that, if the absolute humidity of the air for reproduction at the low-temperature (55° C.) is raised, namely, the air is made to be humidified to make moisture density high, a density of the carbon dioxide exit air in the reproduction zone is securable highly. In other words, the energy loss of moisture desorption was prevented by humidification, and the carbon dioxide in an absorbing state is efficiently desorbed from the absorbent.

Figure 5:
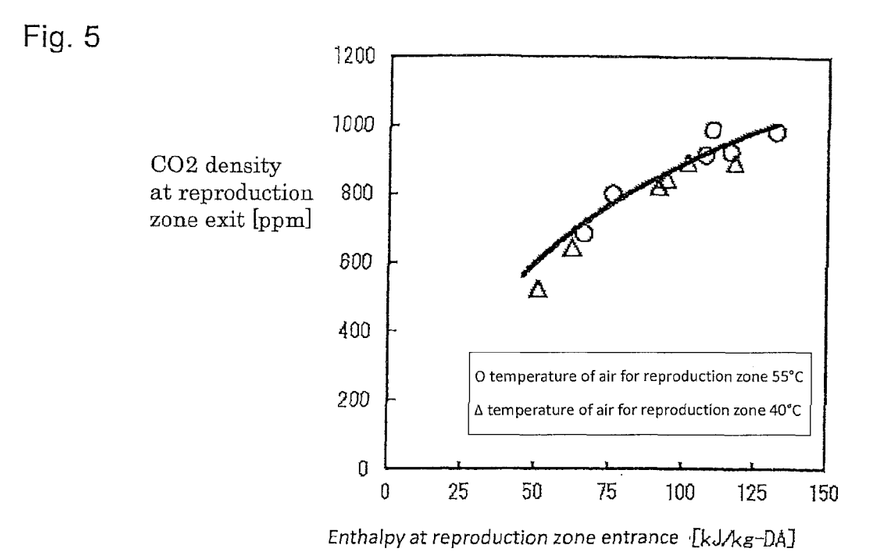
FIG. 5 shows a graph which indicates correlation with the density of carbon dioxide and enthalpy of the air for reproduction in a reproduction zone exit.

As to the example shown in FIG. 5, in a case of that a degree of temperature of the air for reproduction is 40° C. or 55° C., if the enthalpy is made to be equal, density of the carbon dioxide at an exit of the reproduction zone become almost equal. That is, by raising the enthalpy by humidification, even if the temperature of the air for reproduction is low, a carbon dioxide separation performance can be improved.

Figure 1:
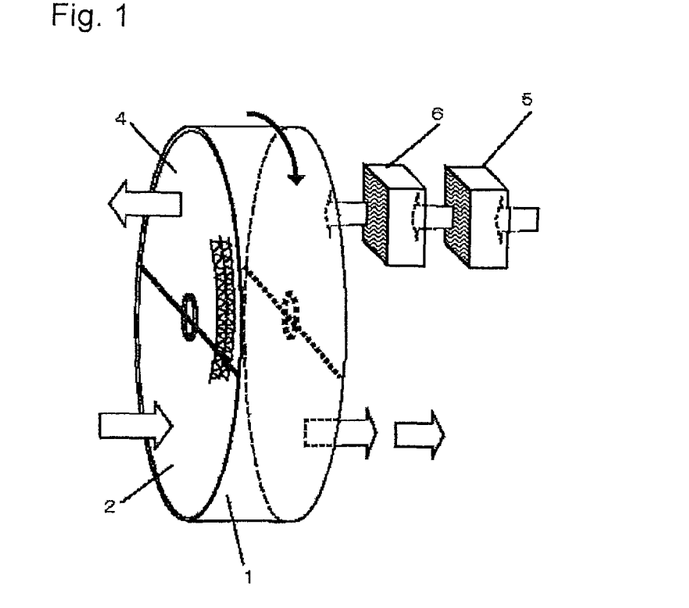
FIG. 1 shows a flow chart in a preferred embodiment 1 of absorption type removal/condensing apparatus of the present invention.
Figure 7:
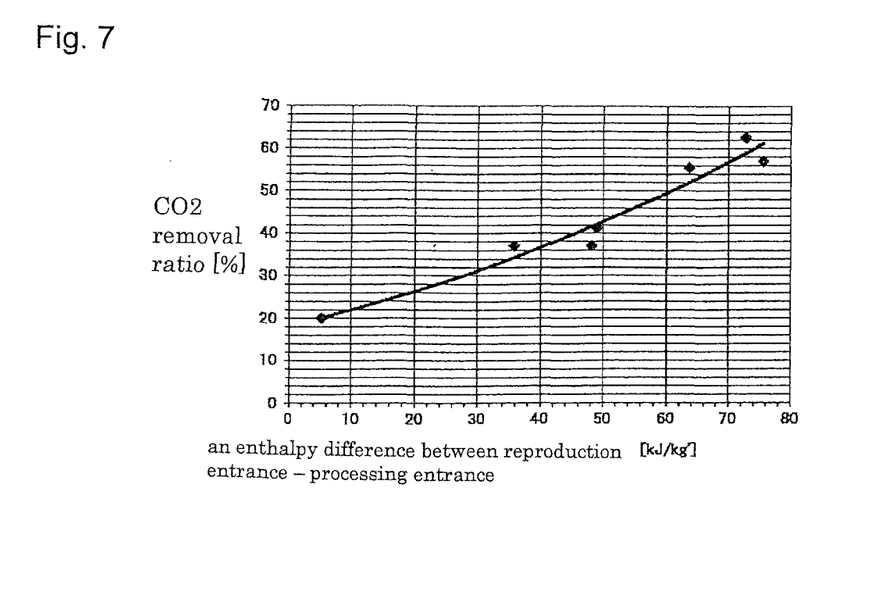
FIG. 7 shows a graph which indicates the carbon dioxide extraction ratio over the enthalpy difference of a reproduction entrance and a processing entrance.

In order to estimate what kind of influence enthalpy in both sides of a reproduction entrance and a processing entrance has on carbon dioxide removal, a humidity adjustment device and a temperature adjustment device are provided in the processing entrance side of the apparatus shown in FIG. 1, and an examination was carried out in a case where a diameter of the honeycomb rotor is 200 mm, a width of the rotor is 200 mm, a degree of temperature of the processing entrance is from 21 through 22° C., a degree of temperature of the reproduction entrance is 45° C., a density of carbon dioxide levels in the processing entrance is 800 ppm, and a density of carbon dioxide at the production entrance is 500 ppm. FIG. 7 shows a graph which, along with a horizontal axis, a value of reproduction entrance enthalpy decreased by a value of processing entrance enthalpy is indicated, and, along with a vertical axis, a value of a carbon dioxide extraction ratio. It is understandable from the graph that carbon dioxide separation performance is so high that a difference of a reproduction entrance enthalpy and a processing entrance enthalpy is larger. Therefore, in the absorption type removal/condensing apparatus of the present invention, a carbon dioxide extraction ratio can be improved by cooling a side of the processing entrance by a cooling device to lower the enthalpy of processing entrance and by humidifying to a side of the reproduction entrance to lower a processing entrance enthalpy. If a temperature-and-humidity measuring device is mounted in the processing entrance side and the reproduction entrance side and values of enthalpy of the processing entrance air and the reproduction entrance air may be measured, it may be made to control a carbon dioxide extraction ratio by the value. If this enthalpy difference becomes larger, depending on an operating condition, the humidity in the side of the processing entrance becomes larger than the humidity in the side of the processing exit, and it serves as humidification operation. If such operation is performed when an indoor humidity is low in such as winter season, since a carbon dioxide extraction ratio is highly and humidification can also be performed, it becomes an effective operating method.

Figure 8:
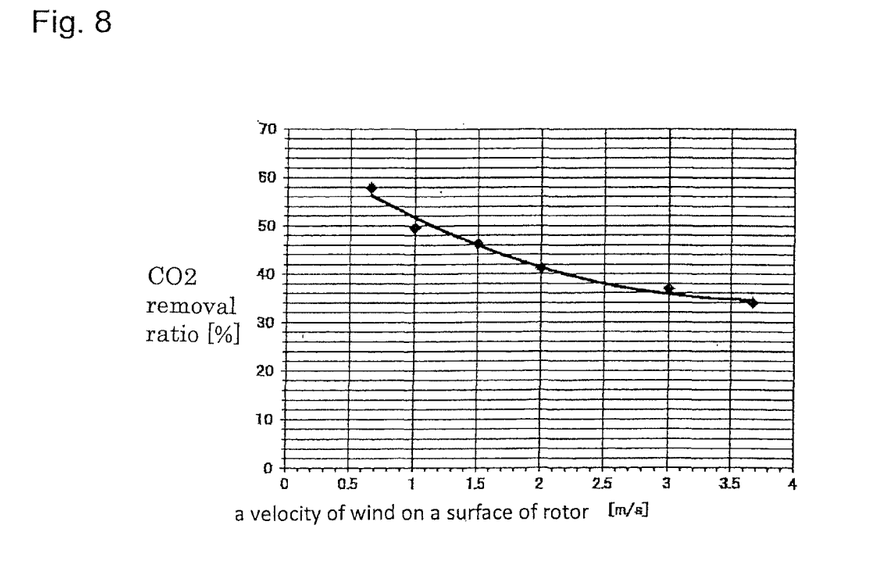
FIG. 8 shows a graph which indicates a carbon dioxide extraction ratio over a velocity of wind on a rotor surface.

FIG. 8 shows a graph indicating that, in the same test equipment, a carbon dioxide extraction ratio was measured in a state where a difference between the reproduction entrance enthalpy and the processing entrance enthalpy is set to be 45 through 50 kJ/kg' as a wind velocity of a rotor surface (speed of the air which passes through each zone of the honeycomb rotor) is changed. Additionally, the wind velocities on the rotor surface in the sides of processing and reproduction are set to be the same. As the graph indicates, if the wind velocity on the rotor surface is set to be faster than 2 m/s, the carbon dioxide extraction ratio do not fall so much. Therefore, it is effective that the absorption type removal/condensing apparatus of the present invention can control outputs of a blower for processing, and a blower for reproduction by an inverter and so on. Thereby, the apparatus can lower the wind velocity on the rotor surface to make carbon dioxide removal high, and can raise the wind velocity on the rotor surface to increase the amount of carbon dioxide removal.

Furthermore, if weakly basic ion-exchange resin and weak acidic ion-exchange resin are mixed and the mixed resin supports on the honeycomb rotor, acidic gas such as SOx and NOx, and alkaline gas such as ammonia, are also removable besides carbon dioxide. In addition, the apparatus may combine with the rotor using activated carbon, hydrophobic zeolite, and a synthetic adsorbent material. In this case, the honeycomb rotor also comes to have a function which can carry out adsorption removal of an indoor bad smell and VOC.

Since the apparatus of the present invention absorbs the carbon dioxide contained in the air to be processed in the processing zone by using the absorbent of carbon dioxide and desorbs the carbon dioxide absorbed in the processing zone by the air for reproduction heated at from 30 through 80° C. and humidified, it is energy saving, comparing with a case where the air for high temperature reproduction is used for a reproduction zone.

Since the processing exit air passed through the processing zone of the absorption type removal/condensing apparatus of the present invention has a low carbon dioxide level, if the processing exit air is supplied to an interior of a room in a building etc., where carbon dioxide level is high, the processing exit air can make indoor carbon dioxide levels low. In this case, since the amount of open air introduced in order to reduce indoor carbon dioxide levels can be reduced sharply, comparing with the usual ventilation, it becomes energy saving. Since the reproduction exit air passed through the reproduction zone of the absorption type removal/condensing apparatus of the present invention has a high carbon dioxide level, if the reproduction exit air is lead to the plant room in such as a house made by vinyl and a plant factory, plants grow earlier and a prevention of discharging the carbon dioxide to the environments is carried out. By both the reproduction exit air and the processing exit air, a high-density carbon dioxide in the reproduction zone may be supplied to the vinyl house with the indoor carbon dioxide removed. For example, the absorption type removal/condensing apparatus of the present invention can make it possible to air-condition a building by the processing exit air which has a low density of carbon dioxide from indoor air by removing the carbon dioxide generated from humans etc., to supply the reproduction exit air which has come to have a high density of carbon dioxide to the vinyl house mounted on the roof of the building, etc., and to promote a growth of plants.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. An absorption-removal/condensing apparatus comprising:
    a honeycomb rotor which has an absorption function of carbon dioxide and supports a solid amine absorbent, said honeycomb rotor being divided into a processing zone and a reproduction zone at least,
    carbon dioxide being removed from subject air to be processed by making the solid amine absorbent of the honeycomb rotor absorb the carbon dioxide contained in the air to be processed by ventilating the air to be processed through said processing zone, and the carbon dioxide absorbed in said processing zone by the solid amine absorbent being released into air for reproduction by ventilating the air for reproduction through said reproduction zone to regenerate the solid amine absorbent of said honeycomb rotor,
    wherein said apparatus has at least one humidity adjustment device which makes high a relative humidity of at least one of the air for reproduction ventilated through said reproduction zone and the air to be processed ventilated through the processing zone.

2. The absorption removal/condensing apparatus according to claim 1, wherein said solid amine absorbent is a weakly basic ion-exchange resin which has primary amine and/or the second class amine as a functional group.

3. The absorption typo removal/condensing apparatus according to claim 1, wherein
    the at least one humidity adjustment device comprises a processing zone humidifier,
    the air to be processed ventilated into said processing zone is made to have a high relative humidity by said processing zone humidifier, and
    a heatless humidifier is used as said processing zone humidifier.

4. The absorption removal/condensing apparatus according to claim 1, wherein
    the at least one humidity adjustment device comprises a processing zone humidifier,
    the air to be processed ventilated into said processing zone is made to have a high relative humidity by said processing zone humidifier, and
    a cooling device is used as said processing zone humidifier.

5. The absorption removal/condensing apparatus according to claim 1, wherein
    the at least one humidity adjustment device comprises a reproduction zone humidifier,
    the air for reproduction ventilated into said reproduction zone is made to have a high relative humidity by said reproduction zone humidifier, and
    a heatless humidifier is used as said reproduction zone humidifier.

6. The absorption type removal/condensing apparatus according to claim 1, wherein a portion of the processed air that has passed through said processing zone is re-circulated back to an entrance of the processing zone and is made to pass through said processing zone together with additional air to be processed.

7. The absorption removal/condensing apparatus according to claim 1, wherein
    a portion of the air for reproduction air that has passed through said reproduction zone is re-circulated back to an entrance of said reproduction zone as circulatory air,
    a heating device heats at least one of the air for reproduction and the circulatory air,
    the at least one humidity adjustment device comprises a reproduction zone humidifier, and
    at least one of the air for reproduction and the circulatory air is made to have a high relative humidity by said reproduction zone humidifier.

8. The absorption-type removal/condensing apparatus according to claim 1, wherein a total heat exchanger is mounted between an entrance and an exit of the reproduction zone, to transfer heat from the exit of said reproduction zone back to the entrance of said reproduction zone.

9. The absorption typo and the removal condensing apparatus according to claim 1, wherein
    said honeycomb rotor is divided into at least the reproduction zone and first and second processing zones,
    the at least one humidity adjustment device comprises a processing zone humidifier,
    the air to be processed is humidified by the processing zone humidifier and passed through said first processing zone, and a portion or all of the air to be processed that has exited from an exit of the first processing zone is made to pass through said second processing zone.

10. The absorption removal/condensing apparatus according to claim 1, wherein
said at least one humidity adjustment device comprises a reproduction zone humidifier, and
the reproduction zone humidifier makes high the relative humidity of the air for reproduction ventilated into said reproduction zone so that a reproduction zone entrance enthalpy becomes higher than a processing zone entrance enthalpy.

11. The absorption removal/condensing apparatus according to claim 1, wherein said apparatus controls a carbon dioxide extraction ratio by controlling a difference between a reproduction zone entrance enthalpy and a processing zone entrance enthalpy.

12. The absorption removal/condensing apparatus according to claim 1, wherein
a wind velocity at an entrance of the reproduction zone is set to be equal to a wind velocity at an entrance of the processing zone entrance, and
a carbon dioxide extraction ratio and an amount of carbon dioxide removal are controlled by controlling the wind velocity at the reproduction zone entrance and the processing zone entrance.

13. The absorption removal/condensing apparatus according to claim 1, wherein
said honeycomb rotor which has an absorption function of carbon dioxide serves as a first honeycomb rotor,
said apparatus further comprises a second honeycomb rotor, and
said second honeycomb rotor is selected from the group consisting of a honeycomb rotor which has a humidity absorption function, a honeycomb rotor which has a humidity adsorption function, a honeycomb rotor which has a function for removing an acidic gas, a honeycomb rotor which has a function for removing an alkaline gas, and a honeycomb rotor which has a function for removing a VOC.

14. The absorption removal/condensing apparatus according to claim 3, wherein the heatless humidifier is a selected from the group consisting of an evaporation humidifier, a water spray humidifier and an ultrasonic humidifier.

15. The absorption removal/condensing apparatus according to claim 5, wherein the heatless humidifier is a selected from the group consisting of an evaporation humidifier, a water spray humidifier and an ultrasonic humidifier.

* * * * *

UNITED STATES PATENT AND TRADEMARK OFFICE
CERTIFICATE OF CORRECTION

PATENT NO. : 9,908,083 B2
APPLICATION NO. : 14/976601
DATED : March 6, 2018
INVENTOR(S) : Kanae Maruyama et al.

Page 1 of 1

It is certified that error appears in the above-identified patent and that said Letters Patent is hereby corrected as shown below:

In the Claims

Column 10, Line 8:
In Claim 3, after "absorption" delete "typo".

Column 10, Line 35:
In Claim 6, after "absorption" delete "type".

Column 10, Line 53:
In Claim 8, delete "absorption-type" and insert -- absorption --, therefore.

Column 10, Line 58:
In Claim 9, after "absorption" delete "typo".

Signed and Sealed this
First Day of May, 2018

Andrei Iancu
*Director of the United States Patent and Trademark Office*